US012733591B2

(12) United States Patent
Dehnke

(10) Patent No.: US 12,733,591 B2
(45) Date of Patent: Sep. 15, 2026

(54) DUAL ROTOR DEFLECTOR SYSTEM AND METHOD

(71) Applicant: DEERE & COMPANY, Moline, IL (US)

(72) Inventor: Jason R. Dehnke, Milan, IL (US)

(73) Assignee: Deere & Company, Moline, IL (US)

( * ) Notice: Subject to any disclaimer, the term of this patent is extended or adjusted under 35 U.S.C. 154(b) by 535 days.

(21) Appl. No.: 18/210,920

(22) Filed: Jun. 16, 2023

(65) Prior Publication Data

US 2024/0138317 A1 May 2, 2024

Related U.S. Application Data

(60) Provisional application No. 63/419,887, filed on Oct. 27, 2022.

(51) Int. Cl.
*A01F 7/06* (2006.01)
*A01D 41/127* (2006.01)

(52) U.S. Cl.
CPC .......... *A01F 7/067* (2013.01); *A01D 41/1271* (2013.01)

(58) Field of Classification Search
CPC .. A01F 7/067; A01F 7/00; A01F 12/18; A01F 7/10; A01D 41/1271; A01D 63/02
USPC ................................. 460/66, 68, 69; 56/14.6
See application file for complete search history.

(56) References Cited

U.S. PATENT DOCUMENTS 4,328,815 A 5/1982 Rowland-Hill
4,611,605 A * 9/1986 Hall ...................... A01F 12/442 460/80
4,875,890 A * 10/1989 Margerum ................ A01F 7/06 460/68
5,928,079 A * 7/1999 Roberg ................... A01F 12/40 460/83
5,957,773 A 9/1999 Olmsted et al.
6,517,431 B2 * 2/2003 Schwersmann ........... A01F 7/06 460/69
6,602,131 B2 * 8/2003 Wolters ................... A01F 12/40 460/111
7,186,179 B1 * 3/2007 Anderson ............... A01F 7/067 460/111
7,731,576 B2 * 6/2010 Isaac ....................... A01F 7/067 460/84

(Continued)

FOREIGN PATENT DOCUMENTS

DE 2815936 C2 * 4/1988 ............. A01F 12/40
EP 3782454 A1 2/2021

*Primary Examiner* — Christopher J Sebesta
*Assistant Examiner* — Sunny D Webb
(74) *Attorney, Agent, or Firm* — Taft Stettinius & Hollister LLP; Stephen F. Rost

(57) ABSTRACT

An agricultural machine includes a dual rotor threshing assembly having a first threshing rotor and a second threshing rotor that are each rotationally coupled to a frame and a deflector that is moveable relative to the frame and relative to the first threshing rotor and the second threshing rotor. The deflector increases an amount of harvested crop directed toward the first threshing rotor relative to the second threshing rotor, or toward the second threshing rotor relative to the first threshing rotor, depending on a position or direction of movement of the deflector. The deflector may be utilized to balance or otherwise change the amount of harvested crop processed by the first threshing rotor and the second threshing rotor.

19 Claims, 12 Drawing Sheets

(56) References Cited

U.S. PATENT DOCUMENTS

| | | | | |
|---|---|---|---|---|
| 8,029,347 | B2 * | 10/2011 | Pohlmann | A01D 41/1243 460/112 |
| 8,926,415 | B2 * | 1/2015 | Farley | A01F 7/067 460/71 |
| 9,155,249 | B2 * | 10/2015 | Baumgarten | A01F 12/28 |
| 11,013,181 | B2 * | 5/2021 | Lesher | A01F 7/067 |
| 2002/0086721 | A1 * | 7/2002 | Schwersmann | A01F 12/10 56/80 |
| 2018/0343798 | A1 | 12/2018 | Duquesne et al. | |
| 2021/0068344 | A1 | 3/2021 | Biggerstaff et al. | |

* cited by examiner 237
240
238
222
224
226
230
234
236
118

237
238
240
222
224
226
230
234
118
236

DUAL ROTOR DEFLECTOR SYSTEM AND METHOD

RELATED DISCLOSURES

This application claims priority to U.S. Provisional Application Ser. No. 63/419,887, filed Oct. 27, 2022, the disclosure of which is hereby incorporated by reference in its entirety.

FIELD OF THE DISCLOSURE

The present disclosure relates to agricultural machines for harvesting crop and, in particular, to systems and methods for directing harvested crop to rotors of a dual rotor threshing assembly of the agricultural machine.

BACKGROUND OF THE DISCLOSURE

Many work machines for harvesting crop utilize a dual rotor threshing assembly to separate grain or the like from the remaining plant debris such as leaves, stalks, and stems. The dual rotor threshing assembly may include two rotor assemblies. Each rotor assembly may include a rotor. As the rotors rotate, grain and debris positioned within the rotor assemblies are agitated and moved axially toward the rear of the rotor assemblies. As the rotors separate the grain from the remaining debris, the grain falls through grates, for example, along lower portions of the rotor assemblies. Once the grain is separated, it is further processed and temporarily stored in a tank of the work machine.

SUMMARY

In some implementations, an agricultural machine for processing harvested crop includes: a cutting head configured to harvest crop; and a dual rotor threshing assembly configured to process the harvested crop and including: a first threshing rotor rotationally coupled to a frame; a second threshing rotor rotationally coupled to the frame; and a deflector that is moveable relative to the frame to increase an amount of harvested crop directed toward the first threshing rotor or the second threshing rotor.

In some implementations, the deflector is positioned upstream of the first threshing rotor and the second threshing rotor. In some implementations, the first threshing rotor is rotatable about a first axis and the second threshing rotor is rotatable about a second axis; and the deflector is positioned between the first axis and the second axis. In some implementations, a majority of the deflector is positioned below the first axis and the second axis.

In some implementations, the deflector is configured to be pivoted relative to the frame. In some implementations, the deflector is configured to be slid relative to the frame. In some implementations, the deflector is configured to be rotated relative to the frame.

In some implementations, the agricultural machine further includes an actuator and a controller operatively coupled to the actuator, and actuation of the actuator causes movement of the deflector relative to the frame; and the controller is configured to receive signals used by the controller to determine a direction of movement for the deflector. In some implementations, the agricultural machine further includes at least one sensor operatively coupled to the controller and configured to send signals thereto used by the controller to determine the direction of movement for the deflector.

In some implementations, the at least one sensor is configured to measure crop load on the first threshing rotor and on the second threshing rotor; and the controller is configured to send signals to the actuator causing movement of the deflector to increase the amount of harvested crop directed toward the first threshing rotor or the second threshing rotor depending on which of the first threshing rotor and the second threshing rotor has a lesser measured crop load.

In some implementations, the at least one sensor is configured to measure a tilt of the agricultural machine; and the controller is configured to send signals to the actuator causing movement of the deflector to increase the amount of harvested crop directed toward the first threshing rotor or the second threshing rotor depending on the measured tilt of the agricultural machine.

In some implementations, the at least one sensor is configured to measure, visually, a crop load on the first threshing rotor and on the second threshing rotor; and the controller is configured to send signals to the actuator causing movement of the deflector to increase the amount of harvested crop directed toward the first threshing rotor or the second threshing rotor depending on which of the first threshing rotor and the second threshing rotor has a lesser measured crop load.

In some implementations, the at least one sensor is configured to measure torque or a parameter indicative torque of the first threshing rotor and of the second threshing rotor; and the controller is configured to send signals to the actuator causing movement of the deflector to increase the amount of harvested crop directed toward the first threshing rotor or the second threshing rotor depending on which of the first threshing rotor and the second threshing rotor has a lesser measured torque.

In some implementations, the at least one sensor is configured to measure crop input to the first threshing rotor and to the second threshing rotor; and the controller is configured to send signals to the actuator causing movement of the deflector to increase the amount of harvested crop directed toward the first threshing rotor or the second threshing rotor depending on which of the first threshing rotor and the second threshing rotor has a lesser measured crop input.

In some implementations, the agricultural machine further includes a user interface operatively coupled to the controller and configured to send signals thereto indicating a direction of movement for the actuator based on user input. In some implementations, the agricultural machine further includes: a guide drum configured to rotate relative to the frame to direct harvested crop to the first threshing rotor and the second threshing rotor. In some implementations, the deflector is positioned downstream of the guide drum.

In another illustrative implementation, an agricultural machine for processing harvested crop includes: a first threshing rotor configured to rotate about a first axis; a second threshing rotor positioned adjacent to the first threshing rotor and configured to rotate about a second axis; and a deflector positioned between the first axis and the second axis; the deflector is moveable relative to the first axis and the second axis; and the deflector is configured to increase an amount of harvested crop directed toward one of the first threshing rotor and the second threshing rotor via movement of the deflector relative to the first axis and the second axis.

In some implementations, the agricultural machine further includes a frame coupled to the first threshing rotor and the second threshing rotor; and the deflector is moveably coupled to the frame. In some implementations, the deflector is removably coupled to the frame.

In another illustrative implementation, a method of processing harvested crop with an agricultural machine includes: harvesting crop as the agricultural machine moves an underlying ground surface; moving the deflector in one of a first direction and a second direction to increase an amount of harvested crop directed toward a first threshing rotor coupled to a frame or a second threshing rotor coupled to the frame and positioned adjacent to the first threshing rotor. In some implementations, moving the deflector in one of the first direction and the second direction includes at least one of: pivoting the deflector toward one of the first threshing rotor and the second threshing rotor; sliding the deflector toward one of the first threshing rotor and the second threshing rotor; and rotating the deflector about an axis of rotation in one of a clockwise direction and a counter-clockwise direction.

BRIEF DESCRIPTION OF THE DRAWINGS

The above-mentioned aspects of the present disclosure and the manner of obtaining them will become more apparent and the disclosure itself will be better understood by reference to the following description of the implementations of the disclosure, taken in conjunction with the accompanying drawings, wherein:

FIG. 6 shows actuators that may be operatively coupled to the controller and configured move respective deflectors that direct harvested crop to the first threshing rotor and the second threshing rotor;

Corresponding reference numerals are used to indicate corresponding parts throughout the several views.

DETAILED DESCRIPTION

The implementations of the present disclosure described below are not intended to be exhaustive or to limit the disclosure to the precise forms in the following detailed description. Rather, the implementations are chosen and described so that others skilled in the art may appreciate and understand the principles and practices of the present disclosure.

Figure 1:
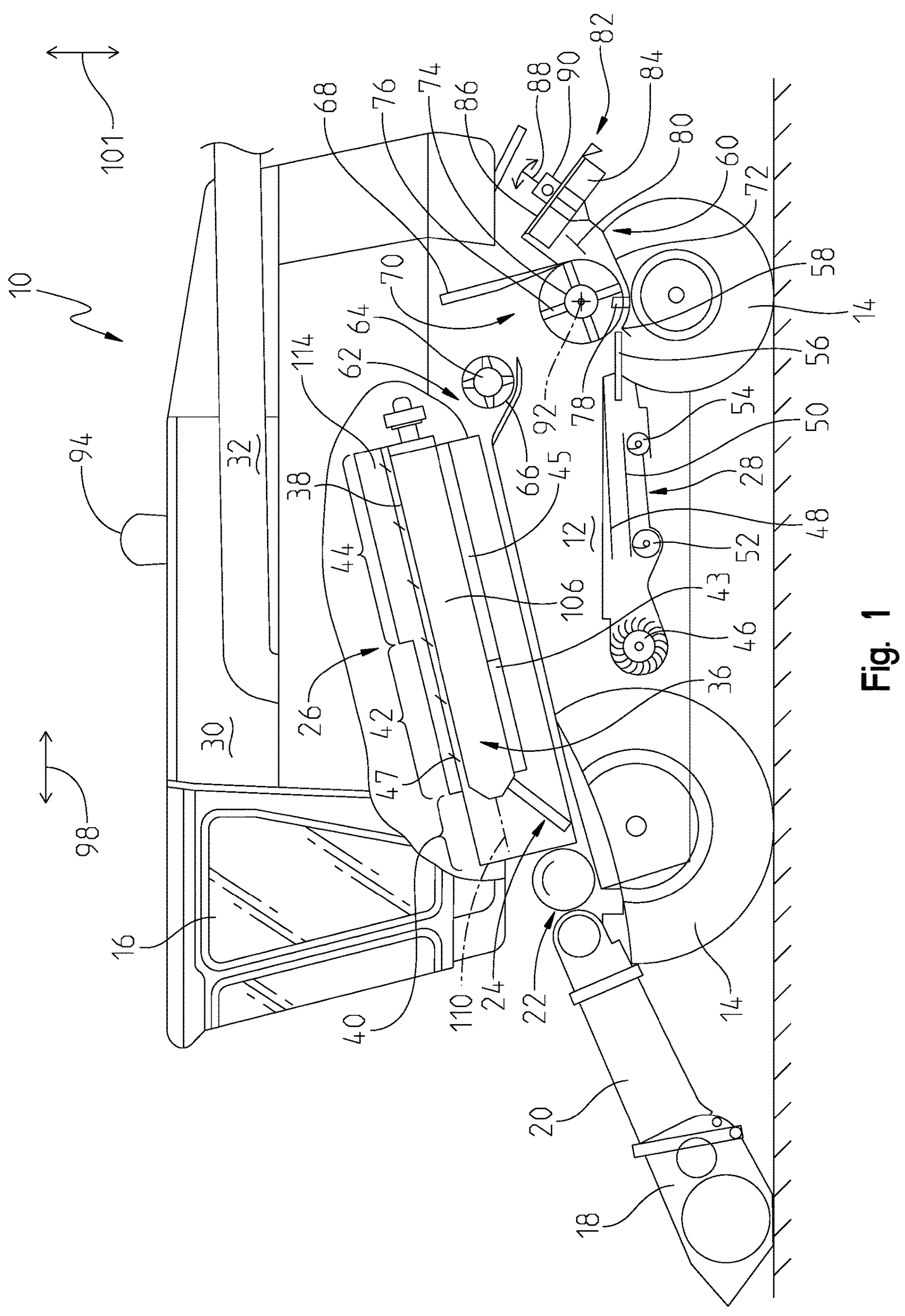
FIG. 1 is a side view of an agricultural machine configured to harvest and process crop.

In FIG. 1, an implementation of an agricultural machine 10 is shown. The agricultural machine 10 includes a frame 12 and one or more ground engaging mechanisms such as wheels 14 or tracks that are in contact with an underlying ground surface. In the illustrative implementation, the wheels 14 are coupled to the frame 12 and are used for propulsion of the agricultural machine 10 in a forward operating direction (which is to the left in FIG. 1) and in other directions. In some implementations, operation of the agricultural machine 10 is controlled from an operator's cab 16. The operator's cab 16 may include any number of controls for controlling the operation of the agricultural machine 10 such as a user interface. In some implementations, operation of the agricultural machine 10 may be conducted by a human operator in the operator's cab 16, a remote human operator, or an automated system.

A cutting head 18 is disposed at a forward end of the agricultural machine 10 and is used to harvest crop and to conduct harvested crop to a slope conveyor 20. The term harvested crop as used herein includes grain (e.g., corn, wheat, soybeans, rice, oats) and material other than grain (MOG). The slope conveyer 20 conducts the harvested crop to a guide drum 22. The guide drum 22 rotates relative to the frame 12 to move the harvested crop below the guide drum 22 to an inlet 24 of a dual rotor threshing assembly 26, as shown in FIGS. 1 and 9-11. The dual rotor threshing assembly 26 includes a first threshing rotor assembly 35 having a first threshing rotor 104 and a second threshing rotor assembly 36 having a second threshing rotor 106. The second threshing rotor assembly 36 is shown in FIG. 1. In the illustrative implementation, the first threshing rotor assembly 35 and the second threshing rotor assembly 36 are identical, and therefore, references made to the rotor assembly 36 and the components thereof are equally applicable to the rotor assembly 35. The first threshing rotor 104 includes a drum 37 arranged along a first threshing axis 108, and the second threshing rotor 106 includes a drum 38 arranged along a second threshing axis 110.

The dual rotor threshing assembly 26 further includes a charging section 40, a threshing section 42, and a separating section 44. The charging section 40 is arranged at a front end of the dual rotor threshing assembly 26, the separating section 44 is arranged at a rear end of the dual rotor threshing assembly 26, and the threshing section 42 is arranged between the charging section 40 and the separating section 44. In the illustrative implementation, the dual rotor threshing assembly 26 further includes a thresher basket 43 and a separating grate 45.

In the illustrative implementation, the thresher basket 43 is positioned in the threshing section 42 below the first and second threshing rotors 104, 106. The thresher basket 43 cooperates with the first and second threshing rotors 104, 106 to process harvested crop, for example, by compressing the harvested crop to remove grain from MOG before the harvested crop is moved to the separating section 44. In the illustrative implementation, the separating grate 45 is positioned in the separating section 44 below the first and second threshing rotors 104, 106. The separating grate 45 cooperates with the first and second threshing rotors 104, 106 to process harvested crop, for example, by facilitating separation of the harvested crop to release grain from MOG.

Harvested crop falls through the thresher basket 43 and through the separating grate 45. The harvested crop may be directed to a clean crop routing assembly 28 with a blower 46 and sieves 48, 50 with louvers. The sieves 48, 50 can be oscillated in the fore-and-aft direction 98. The clean crop routing assembly 28 removes MOG and guides grain over a screw conveyor 52 to a grain elevator 94. The grain elevator 94 deposits the grain in a grain tank 30, as shown in FIG. 1. The grain in the grain tank 30 can be unloaded by an unloading screw conveyor 32 to a grain wagon, trailer, or truck, for example. Harvested crop remaining at a rear end of the sieve 50 is again transported to the dual rotor threshing assembly 26 by a screw conveyor 54. Harvested crop remaining at a rear end of the sieve 48 is conveyed by an oscillating sheet conveyor 56 to a lower inlet 58 of a crop debris routing assembly 60.

The aforementioned blower 46 produces air flow that carries portions of MOG (e.g., chaff and straw particles) downstream in the agricultural machine 10 and to the crop debris routing assembly 60. Straw is ejected through an outlet 62 of the dual rotor threshing assembly 26 and conducted to an ejection drum 64. The ejection drum 64 interacts with a sheet 66 arranged underneath the ejection drum 64 to move straw downstream. A wall 68 is located to the rear of the ejection drum 64 and guides the straw into an upper inlet 70 of the crop debris routing assembly 60.

The crop debris routing assembly 60 includes a chopper housing 72 and a chopper rotor 74 arranged in the chopper housing 72. The chopper rotor 74 rotates in a counter-clockwise direction, for example, about a chopper axis 92. In the illustrative implementation, the chopper axis 92 extends in a lateral direction perpendicular to the fore-and-aft direction 98. The chopper rotor 74 includes a plurality of chopper knives 76 extending to a circumference of the chopper rotor 74. The crop debris routing assembly 60 further includes opposing knives 78 (one of which is shown in FIG. 1) that are coupled to the chopper housing 72. In some implementations, the opposing knives 78 may be spaced laterally apart from and interleaved with the chopper knives 76. The chopper knives 76 cooperate with the opposing knives 78 to chop the straw into smaller pieces.

Referring again to FIG. 1, in some implementations, one or more spreaders are provided downstream of an outlet 80 of the crop debris routing assembly 60. One spreader is shown in FIG. 1. The spreader 82 may include a number of impeller blades 84, each of which is connected to a disk 86 that rotates about central axis 88. The disk 86 may be rotatably driven by a hydraulic motor 90, for example, and rotation of the disk 86 rotates the impeller blades 84. Chopped straw is moved through the outlet 80 of the crop debris routing assembly 60 to the spreader 82. Rotation of the impeller blades 84 of the spreader 82 spreads the chopped straw as the chopped straw exits the agricultural machine 10.

While FIG. 1 illustrates one type of agricultural machine 10, the teachings of this disclosure are not limited to the specific machine shown and described herein with reference to FIG. 1. Rather, the teachings of this disclosure may be applied to any type of harvesting machine that utilizes more than one rotor assembly for processing harvested crop. The implementation of FIG. 1 is merely a non-exclusive example of an agricultural machine 10 within the scope of the present disclosure.

The first threshing rotor 104 and the second threshing rotor 106 are rotationally coupled to the frame 12 of the agricultural machine 10, for example, by any number of brackets, bearings, or the like. In some implementations, the first threshing rotor 104 and the second threshing rotor 106 are indirectly coupled to the frame 12. The first threshing rotor 104 is configured to rotate about the first axis 108, and the second threshing rotor 106 is configured to rotate about the second axis 110. In this configuration, harvested crop is received by the first threshing rotor assembly 35 and the second threshing rotor assembly 36 via the inlet 24 of the dual rotor threshing assembly 26. The agricultural machine 10 may selectively rotate the first threshing rotor 104 and the second threshing rotor 106 via a mechanical linkage coupled to a prime mover, a hydraulic motor, an electric motor, a pneumatic motor, or any other system for rotating an assembly.

Figure 2:
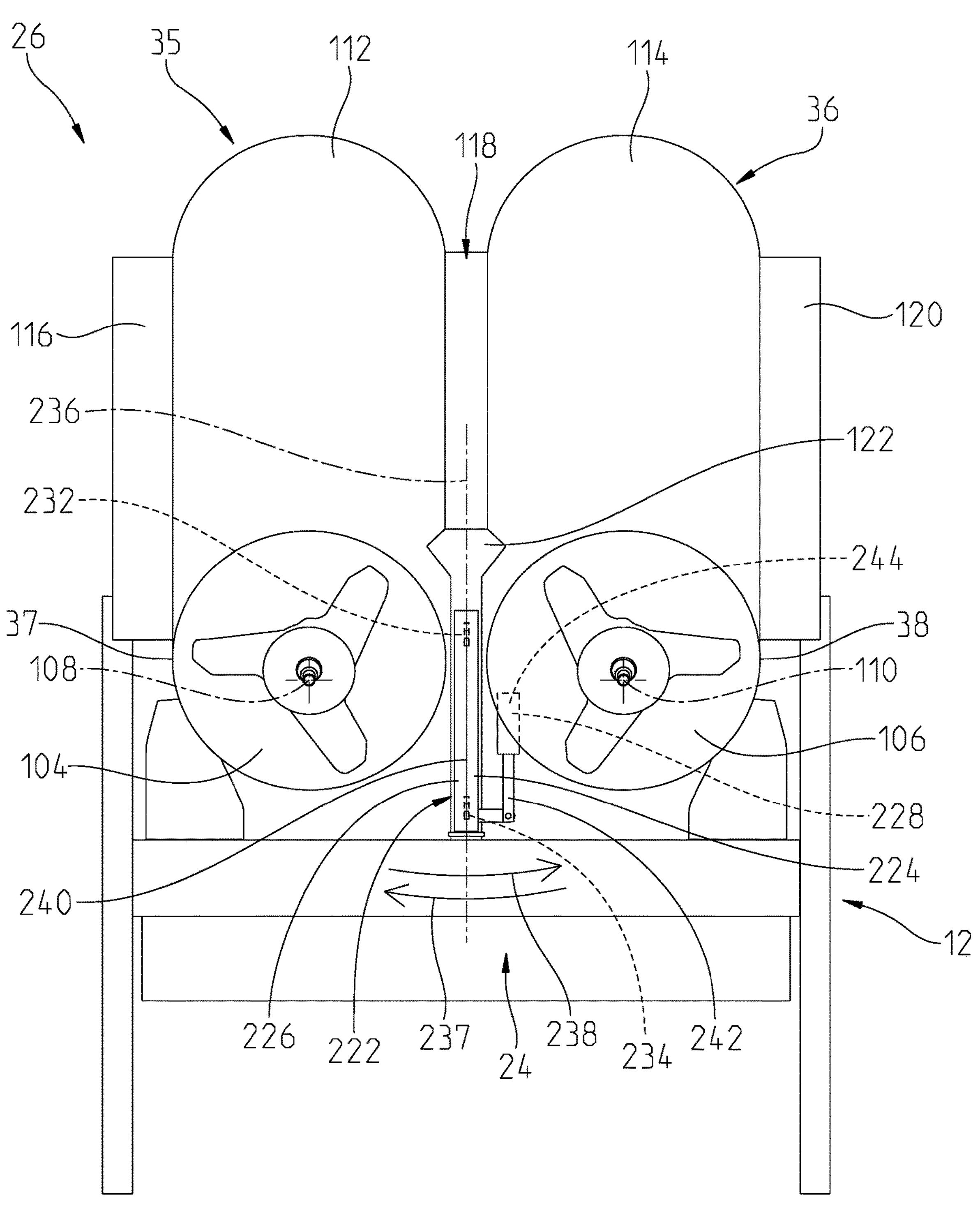
FIG. 2 is a semi-diagrammatic front perspective view of a dual rotor threshing assembly with a deflector configured to be pivoted to increase an amount of harvested crop directed to a first threshing rotor or a second threshing rotor depending on a direction of movement of the deflector.
Figure 9:
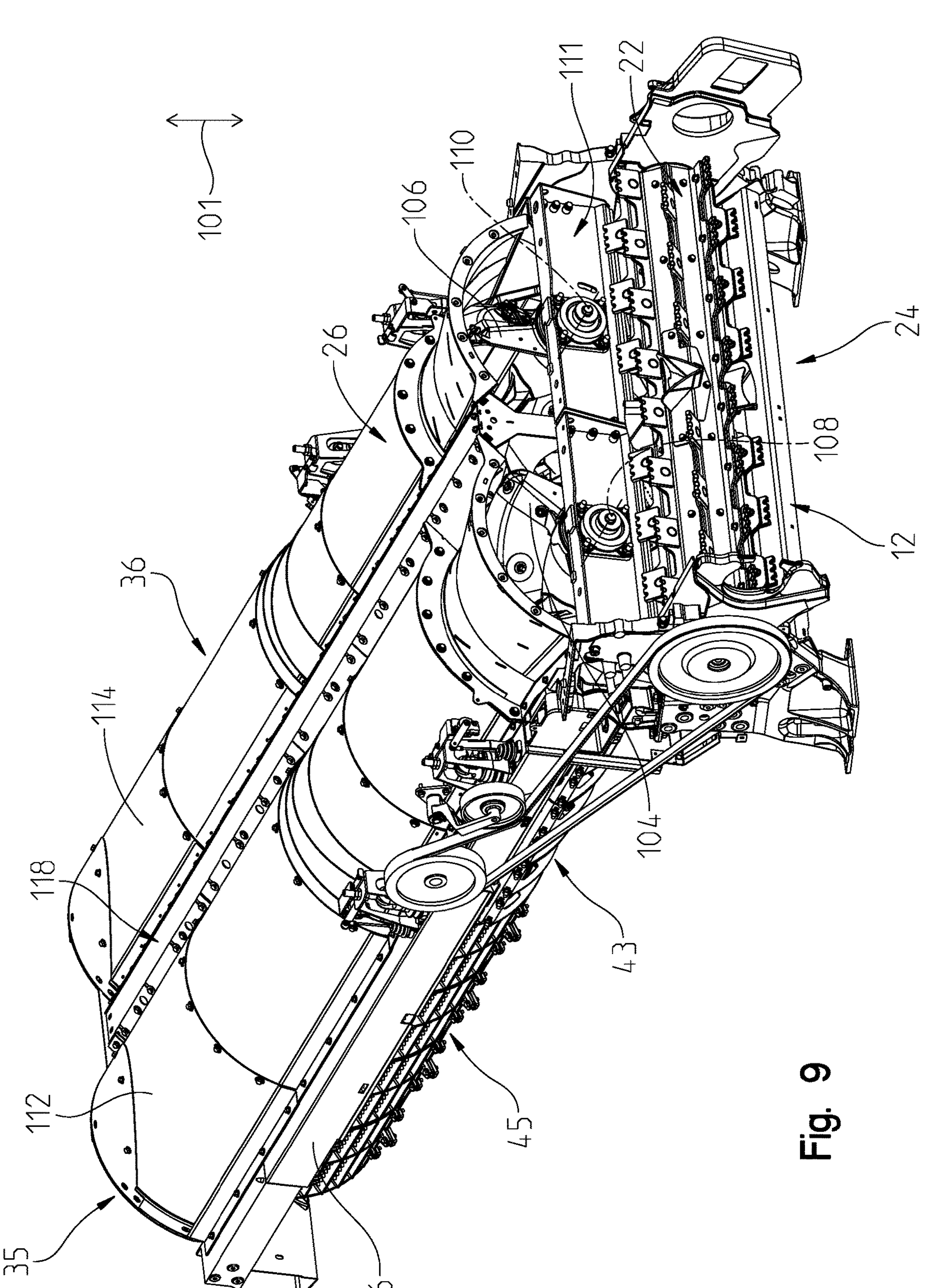
FIG. 9 is a front perspective view of a dual rotor threshing assembly and a guide drum that is configured to direct harvested crop to first and second threshing rotors of the dual rotor threshing assembly.

In the illustrative implementation, the frame 12 includes a first cover 112, a second cover 114, a first side panel 116, a spine 118, and a second side panel 120. The spine 118 is positioned adjacent to and between the first threshing rotor 104 and the second threshing rotor 106. The spine 118 separates the first threshing rotor assembly 35 from the second threshing rotor assembly 36. The first cover 112 extends from the first side panel 116 to the spine 118, and the second cover 114 extends from the spine 118 to the second side panel 120. As illustrated in FIGS. 2 and 9, the first cover 112 has an arc-shaped profile to form at least part of a cylindrical cavity of the first threshing rotor assembly 35 corresponding to a shape of the first threshing rotor 104, and the second cover 114 has an arc-shaped profile to form at least part of a cylindrical cavity of the second threshing rotor assembly 36 corresponding to a shape of the second threshing rotor 106.

As shown in FIG. 2, a deflector 222 is positioned at a forward end 122 of the spine 118 and laterally between the first threshing rotor 104 and the second threshing rotor 106. In the illustrative implementation, the deflector 222 is positioned upstream of the first threshing rotor 104 and the second threshing rotor 106. The deflector 222 is positioned downstream of the guide drum 22 to direct harvested crop received from the guide drum 22 toward each of the first threshing rotor 104 and the second threshing rotor 106. In the illustrative implementation, the deflector 222 is coupled to the spine 118. In some implementations, the deflector 222 is permanently coupled to the spine 118. In some implementations, the deflector 222 is removably coupled to the spine 118, for example, via fasteners.

As shown in FIG. 2, the deflector 222 is moveable relative to the frame 12. Movement of the deflector 222 alters an amount of harvested crop directed toward the first threshing rotor 104 and the second threshing rotor 106. For example, movement of the deflector 222 increases the amount of harvested crop directed toward one of the first threshing rotor 104 and the second threshing rotor 106, and likewise, decreases the amount of harvested crop directed toward the other of the first threshing rotor 104 and the second threshing rotor 106. This is different than deflectors of conventional agricultural machines, which, all other variables being equal (e.g., tilt of the machine or crop intake at each side of the machine), tend to deflect harvested crop equally toward a first threshing rotor and a second threshing rotor. In the illustrative implementation, during movement of the deflector 222, the deflector 222 remains positioned between the first axis 108 and the second axis 110.

Figure 3A:
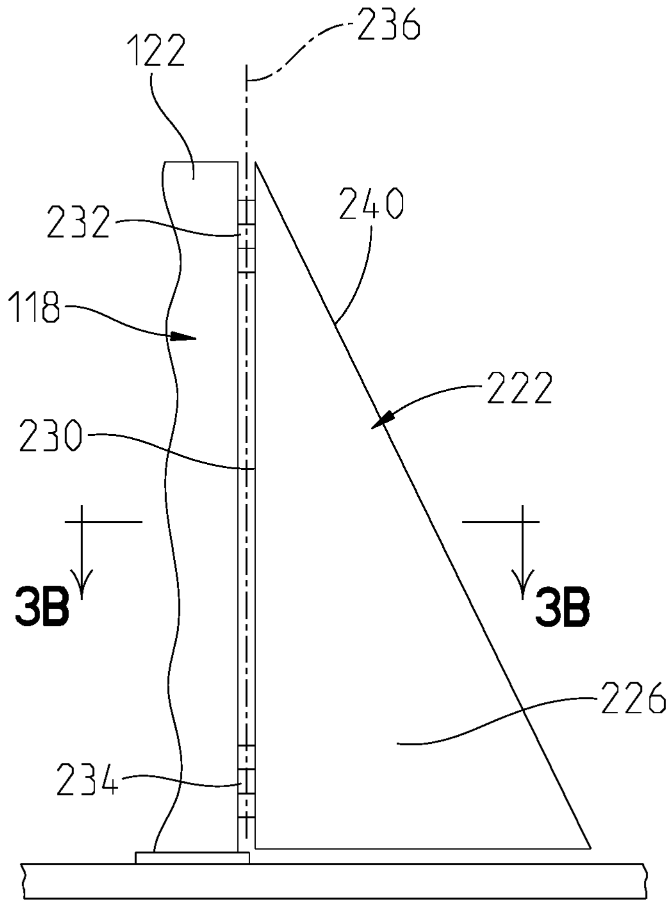
FIG. 3A is a side view of the deflector of FIG. 2 showing the deflector pivotably coupled to a spine separating the first threshing rotor and the second threshing rotor.
Figures 3B, 3C:
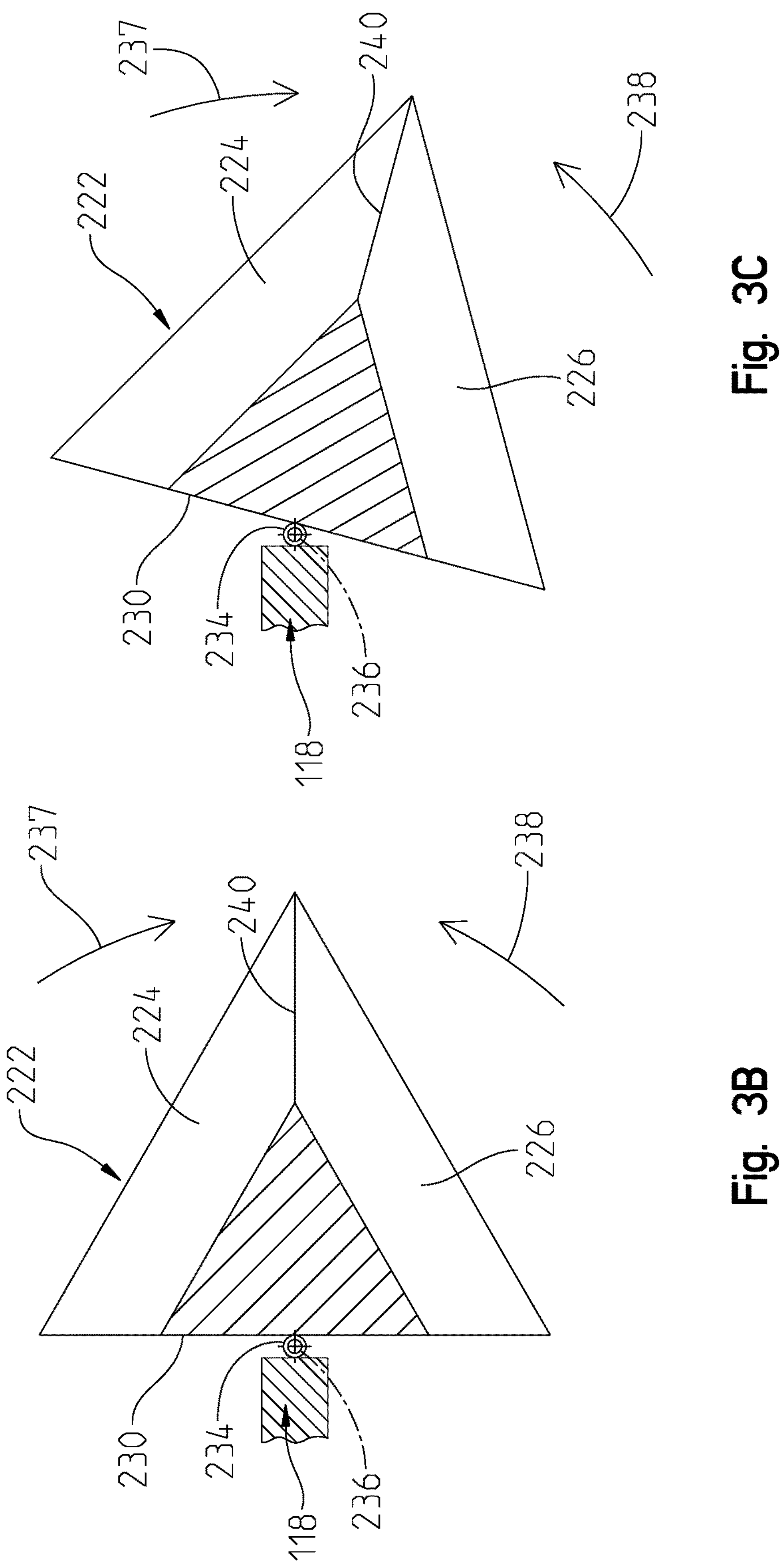
FIG. 3B is a top-down cross section view of the deflector of FIG. 2 showing a geometry of the deflector, in which the cross section is taken along the line indicated in FIG. 3A.
FIG. 3C is a top-down cross section view of the deflector of FIG. 2 showing the deflector pivoted relative to the view of the deflector shown in FIG. 3B.

As shown by FIG. 2, the deflector 222 is configured to pivot relative to the frame 12 about axis 236 in the directions of arrows 237, 238. The deflector 222 may also be described as pivotable relative to the spine 118 or pivotable relative to the first and second threshing rotors 104, 106. As shown in FIG. 3A, in one example, a rearward portion 230 of the deflector 222 may be pivotably coupled to the spine 118 via hinges 232, 234. As shown in FIGS. 3A, 3B, and 3C, the deflector 222 also includes a forward portion 240, a first side 224, and a second side 226. As shown in FIGS. 3B and 3C, the first side 224 and the second side 226 each extend outwardly (i.e., laterally) and rearwardly away from the forward portion 240. This geometry aids in directing harvested crop to the first threshing rotor 104 and the second threshing rotor 106. The forward portion 240 of the deflector 222 is pivotable toward the first threshing rotor 104 or the second threshing rotor 106. For example, FIG. 3B shows the deflector 222 aligned with the spine 118, and FIG. 3C shows the deflector 222 pivoted about the axis 236 in the direction of the arrow 237 toward the first threshing rotor 104.

Referring again to FIG. 2, in the illustrative implementation, an actuator 228 is coupled at a first end 242 to the first side 224 of the deflector 222 and at a second end 244 to the frame 12. In some implementations, the actuator 228 is indirectly coupled to the deflector 222 and indirectly coupled to the frame 12. While in FIG. 2 the actuator 228 is embodied as a linear actuator, the actuator 228 may also be a rotary actuator or any other type of actuator operable to pivot the deflector 222 relative to the frame 12 and the spine 118. The actuator 228 may be electric, hydraulic, pneumatic, or any other type operable to actuate the deflector 222.

Figure 4:
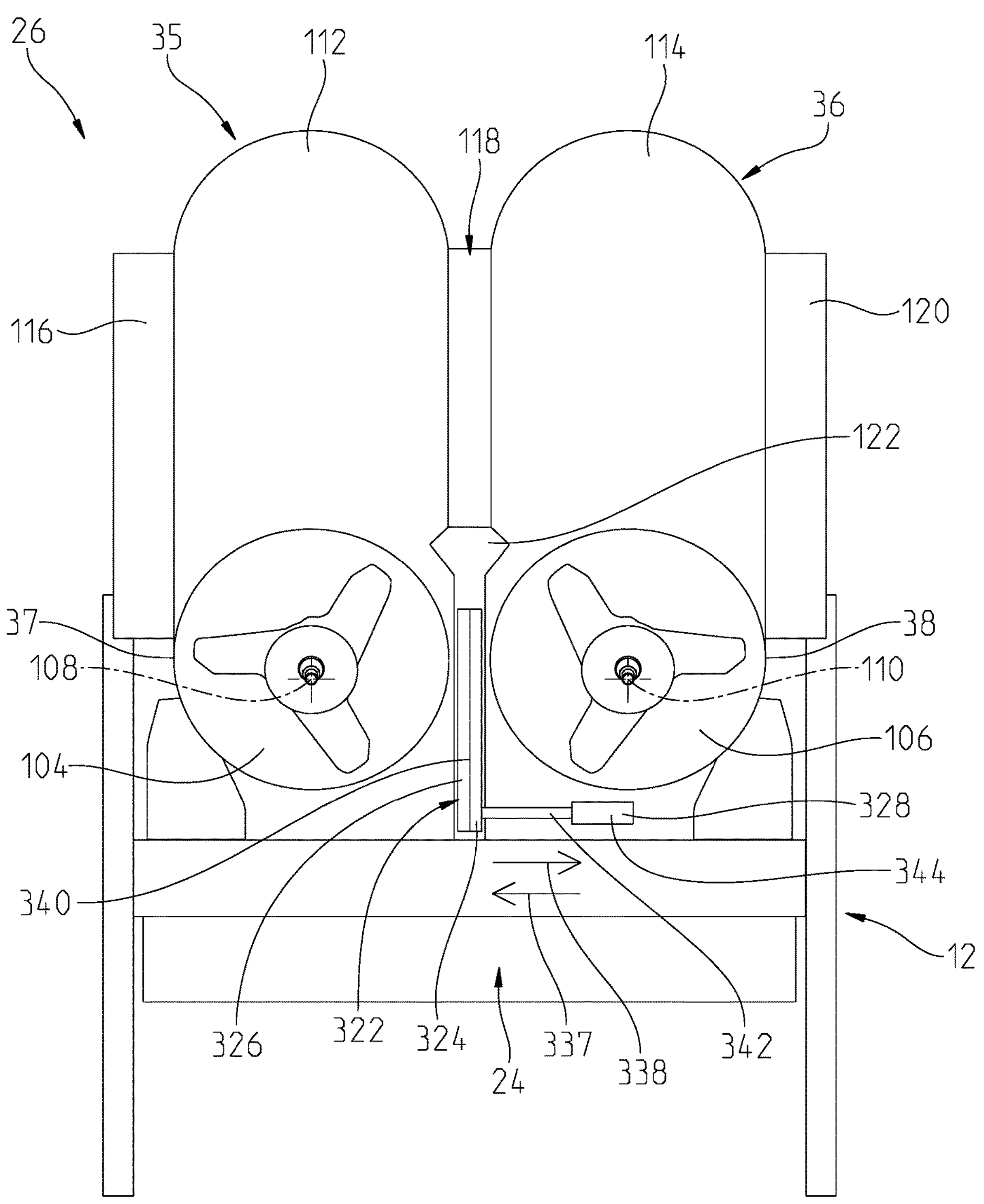
FIG. 4 is a semi-diagrammatic front perspective view of a dual rotor threshing assembly with a deflector configured to be slid to increase an amount of harvested crop directed to a first threshing rotor or a second threshing rotor depending on a direction of movement of the deflector.

FIG. 4 shows another implementation of the dual rotor threshing assembly 26, which includes a deflector 322. As shown in FIG. 4, the deflector 322 is positioned upstream of the first threshing rotor 104 and the second threshing rotor 106. The deflector 322 is moveable relative to the frame 12. Movement of the deflector 322 alters an amount of harvested crop directed to the first threshing rotor 104 and the second threshing rotor 106. For example, movement of the deflector 322 increases the amount of harvested crop directed toward one of the first threshing rotor 104 and the second threshing rotor 106, and likewise, decreases the amount of harvested crop directed toward the other of the first threshing rotor 104 and the second threshing rotor 106. This is different than deflectors of conventional agricultural machines, which, all other variables being equal (e.g., tilt of the machine or crop intake at each side of the machine), tend to deflect harvested crop equally toward a first threshing rotor and a second threshing rotor. In the illustrative implementation, during movement of the deflector 322, the deflector 322 remains positioned between the first axis 108 and the second axis 110. In some implementations, the deflector 222 is permanently coupled to the spine 118. In some implementations, the deflector 222 is removably coupled to the spine 118, for example, via fasteners.

As suggested by FIG. 4, the deflector 322 is configured to slide laterally relative to the frame 12 in the directions indicated by arrows 337, 338. The deflector 322 may also be described as slidable laterally relative to the spine 118 or relative to the first and second threshing rotors 104, 106. In an illustrative implementation, the deflector 322 may be slidably coupled to one or more laterally extending rails or channels that are fixed relative to the frame 12. In the illustrative implementation, the deflector 322 includes a forward portion 340, a first side 324, and a second side 326. The first side 324 and the second side 326 each extend outwardly (i.e., laterally) and rearwardly away from the forward portion 340. Thus, in the illustrative implementation, the deflector 322 has the same shape as the deflector 222, which is shown in FIGS. 3A, 3B, and 3C. This geometry aids in directing harvested crop to the first threshing rotor 104 and the second threshing rotor 106.

In the illustrative implementation, an actuator 328 is coupled at a first end 342 to the first side 324 of the deflector 322 and at a second end 344 to the frame 12. In some implementations, the actuator 328 is indirectly coupled to the deflector 322 and the frame 12. While in FIG. 4 the actuator 328 is embodied as a linear actuator, in other instances, the actuator 328 may be a rotary actuator or any other type of actuator operable to slide the deflector 322 relative to the frame 12 and the spine 118. The actuator 328 may be electric, hydraulic, pneumatic, or any other type operable to actuate the deflector 322.

Figure 5:
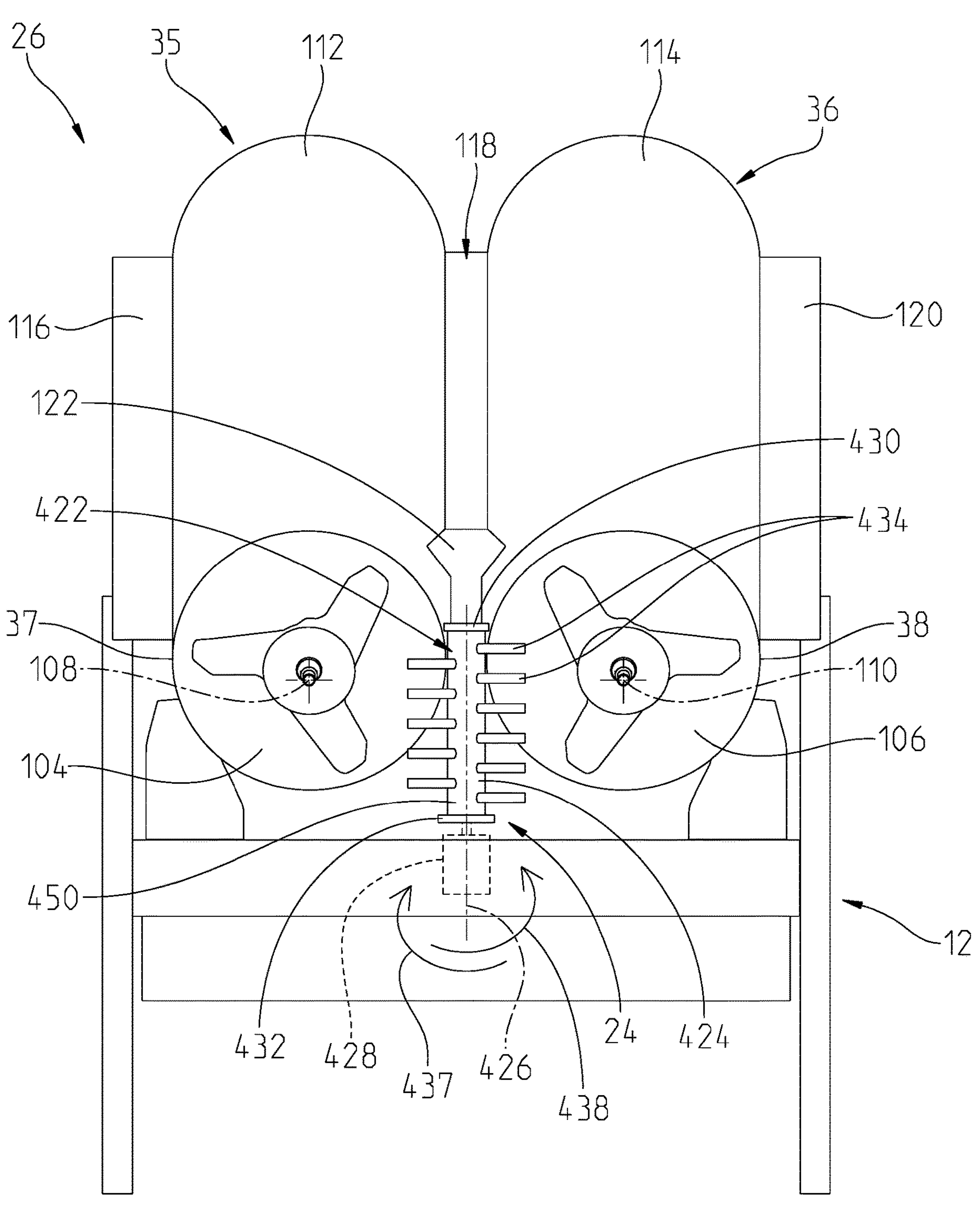
FIG. 5 is a semi-diagrammatic front perspective view of a dual rotor threshing assembly with a deflector configured to be rotated to increase an amount of harvested crop directed to a first threshing rotor or a second threshing rotor depending on a direction of movement of the deflector.

FIG. 5 shows another implementation of the dual rotor threshing assembly 26, which includes a deflector 422. As shown, the deflector 422 is positioned upstream of the first threshing rotor 104 and the second threshing rotor 106. The deflector 422 is moveable relative to the frame 12. Movement of the deflector 422 alters an amount of harvested crop directed toward the first threshing rotor 104 and the second threshing rotor 106. For example, movement of the deflector 422 increases the amount of harvested crop directed toward one of the first threshing rotor 104 and the second threshing rotor 106, and likewise, decreases the amount of harvested crop directed toward the other of the first threshing rotor 104 and the second threshing rotor 106. This is different than deflectors of conventional agricultural machines, which, all other variables being equal (e.g., tilt of the machine or crop intake at each side of the machine), tend to deflect harvested crop equally toward a first threshing rotor and a second threshing rotor. In the illustrative implementation, during movement of the deflector 422, the deflector 422 remains positioned between the first axis 108 and the second axis 110. In some implementations, the deflector 422 is permanently coupled to the spine 118. In other implementations, the deflector 422 is removably coupled to the spine 118, for example, via fasteners.

As suggested by FIG. 5, the deflector 422 is configured to rotate clockwise in the direction of arrow 437 or counter-clockwise in the direction of arrow 438 about a rotational axis 426 relative to the frame 12. The deflector 422 may also be described as rotatable clockwise or counter-clockwise relative to the spine 118 or the first and second threshing rotors 104, 106. As used herein, a component configured to be rotated is configured to move 360 degrees about an axis, and a component configured to be pivoted is configured to move less than 360 degrees about an axis.

In an illustrative implementation, the deflector 422 may be rotatably coupled to the frame 12 (e.g., to the spine 118) via bearings 430, 432. In the illustrative implementation, the deflector 422 includes a body portion 424, which may be cylindrical. The deflector 422 may also include a plurality of protrusions, indents, or other features forming a texture surface of the deflector 422 for better contacting and directing harvested crop. For example, the deflector 422 may include a plurality of fingers 434 extending outwardly from the body portion 424 and configured to contact and direct harvested crop. The fingers 434 aid in directing harvested crop to the first threshing rotor 104 and the second threshing rotor 106. The body portion 424 is defined about the rotational axis 426, about which the deflector 422 is configured to rotate. The rotational axis 426 is fixed relative to the frame 12, the spine 118, the first threshing rotor 104 and the second threshing rotor 106, and the axes 108, 110. In the illustrative implementation, the deflector 422 is coupled, for example, at a first end 450 of the body portion 424, to an actuator 428. In some implementations, the actuator 428 is indirectly coupled to deflector 422 and the frame 12. In the illustrative implementation, the actuator 428 is embodied as a rotary actuator; however, in some implementations, the actuator 428 may be another type of actuator operable to rotate the deflector 422. The actuator 428 may be electric, hydraulic, pneumatic, or another type of actuator.

Figure 10:
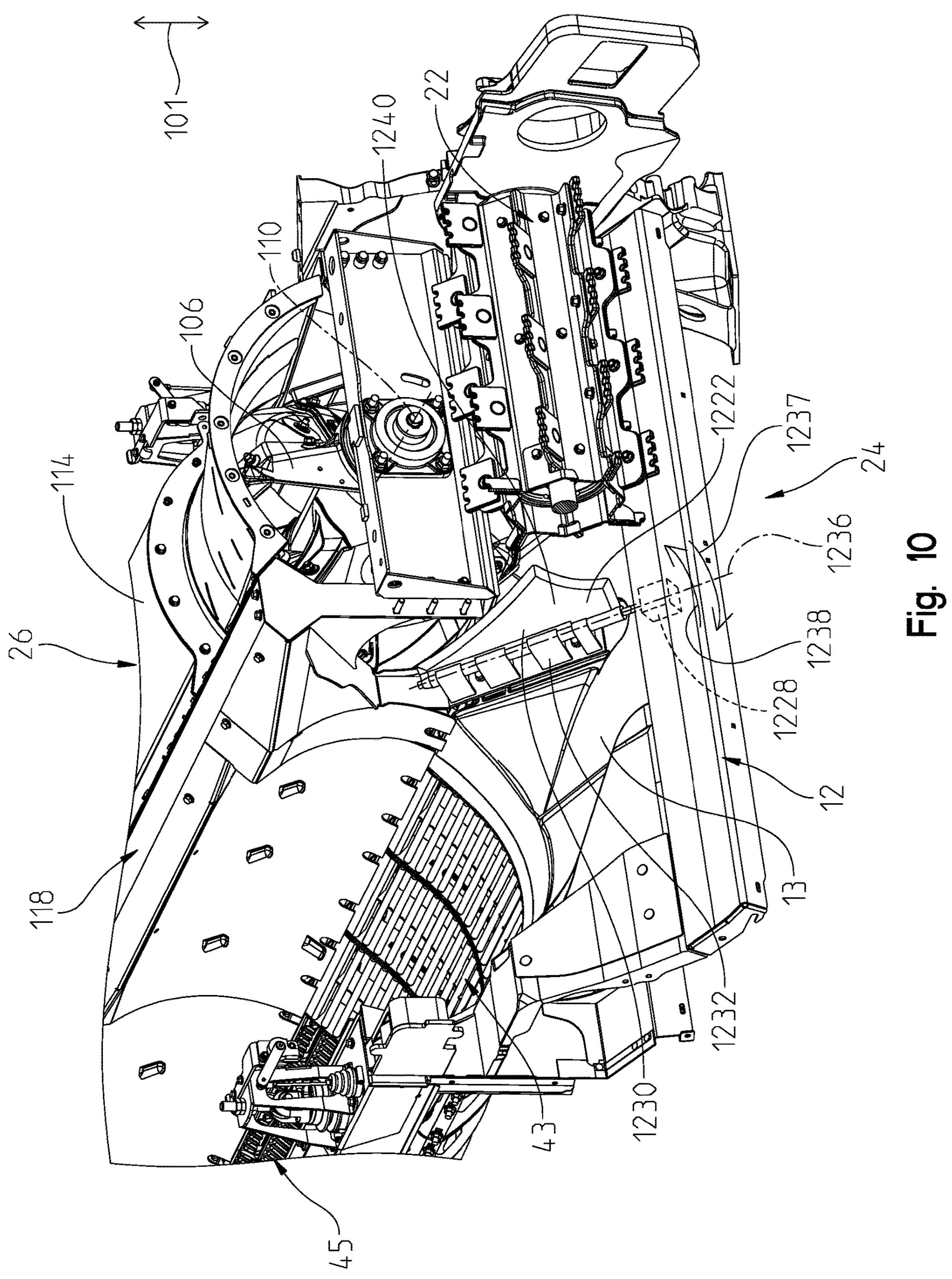
FIG. 10 is a front perspective view of a dual rotor threshing assembly with another deflector configured to be pivoted to increase an amount of harvested crop directed to a first threshing rotor or a second threshing rotor depending on a direction of movement of the deflector.

FIG. 10 shows another implementation of the dual rotor threshing assembly 26, which includes a deflector 1222. The deflector 1222 is positioned laterally between the first threshing rotor 104 and the second threshing rotor 106. In the illustrative implementation, the deflector 1222 is positioned upstream of the first threshing rotor 104 and the second threshing rotor 106. The deflector 1222 is positioned downstream of the guide drum 22, which extends in the lateral direction perpendicular to the first and second axes 108, 110. The deflector 1222 is configured to direct harvested crop received from the guide drum 22 toward each of the first threshing rotor 104 and the second threshing rotor 106. In the illustrative implementation, the deflector 1222 is coupled to the frame 12 and indirectly coupled to the spine 118 of the frame 12. In some implementations, the deflector 1222 is permanently coupled to the frame 12. In some implementations, the deflector 1222 is removably coupled to the frame 12, for example, via fasteners.

As shown in FIG. 10, the deflector 1222 is moveable relative to the frame 12. Movement of the deflector 1222 alters an amount of harvested crop directed toward the first threshing rotor 104 and the second threshing rotor 106. For example, movement of the deflector 1222 increases the amount of harvested crop directed toward one of the first threshing rotor 104 and the second threshing rotor 106, and likewise, decreases the amount of harvested crop directed toward the other of the first threshing rotor 104 and the second threshing rotor 106. This is different than deflectors of conventional agricultural machines, which, all other variables being equal (e.g., tilt of the machine or crop intake at each side of the machine), tend to deflect harvested crop equally toward a first threshing rotor and a second threshing rotor. In the illustrative implementation, during movement of the deflector 1222, the deflector 1222 remains positioned between the first axis 108 and the second axis 110. As shown in FIG. 10, in some implementations, a majority of the deflector 1222 is positioned below the first axis 108 and the second axis 110. In some implementations, an entirety of the deflector 1222 is positioned below the first axis 108 and the second axis 110. The terms above and below, are used herein with reference to the vertical direction 101, which is shown by the double sided arrow in FIGS. 1 and 10-11.

As shown in FIG. 10, the deflector 1222 is configured to pivot relative to the frame 12 about an axis 1236 in the directions of arrows 1237, 1238. The deflector 1222 may also be described as pivotable relative to the spine 118 or pivotable relative to the first and second threshing rotors 104, 106. As shown in FIG. 10, a rearward portion 1230 of the deflector 1222 may be pivotably coupled to the frame 12 via a hinge 1232. In the illustrative implementation, the frame 12 includes a floor 13 over which harvested crop passes, and the deflector 1222 is pivotably coupled to the floor 13 of the frame 12. As shown in FIG. 10, in the illustrative implementation, the deflector 1222 is shaped to accommodate available space between the guide drum 22 and the first and second threshing rotors 104, 106. For example, in the illustrative implementation, the deflector 1222 includes a forward portion 1240 having a cut-out (for example, an arcuate cut-out), and a lower portion of the deflector 1222 has a great length than an upper portion of the deflector 1222.

Referring still to FIG. 10, in the illustrative implementation, an actuator 1228 is coupled to the deflector 1222 and to the frame 12. In the illustrative implementation, the actuator 1228 is embodied as a rotary actuator; however, in some implementations, the actuator 1228 may be another type of actuator operable to cause pivoting movement of the deflector 1222. The actuator 1228 may be electric, hydraulic, pneumatic, or another type of actuator.

Figure 11:
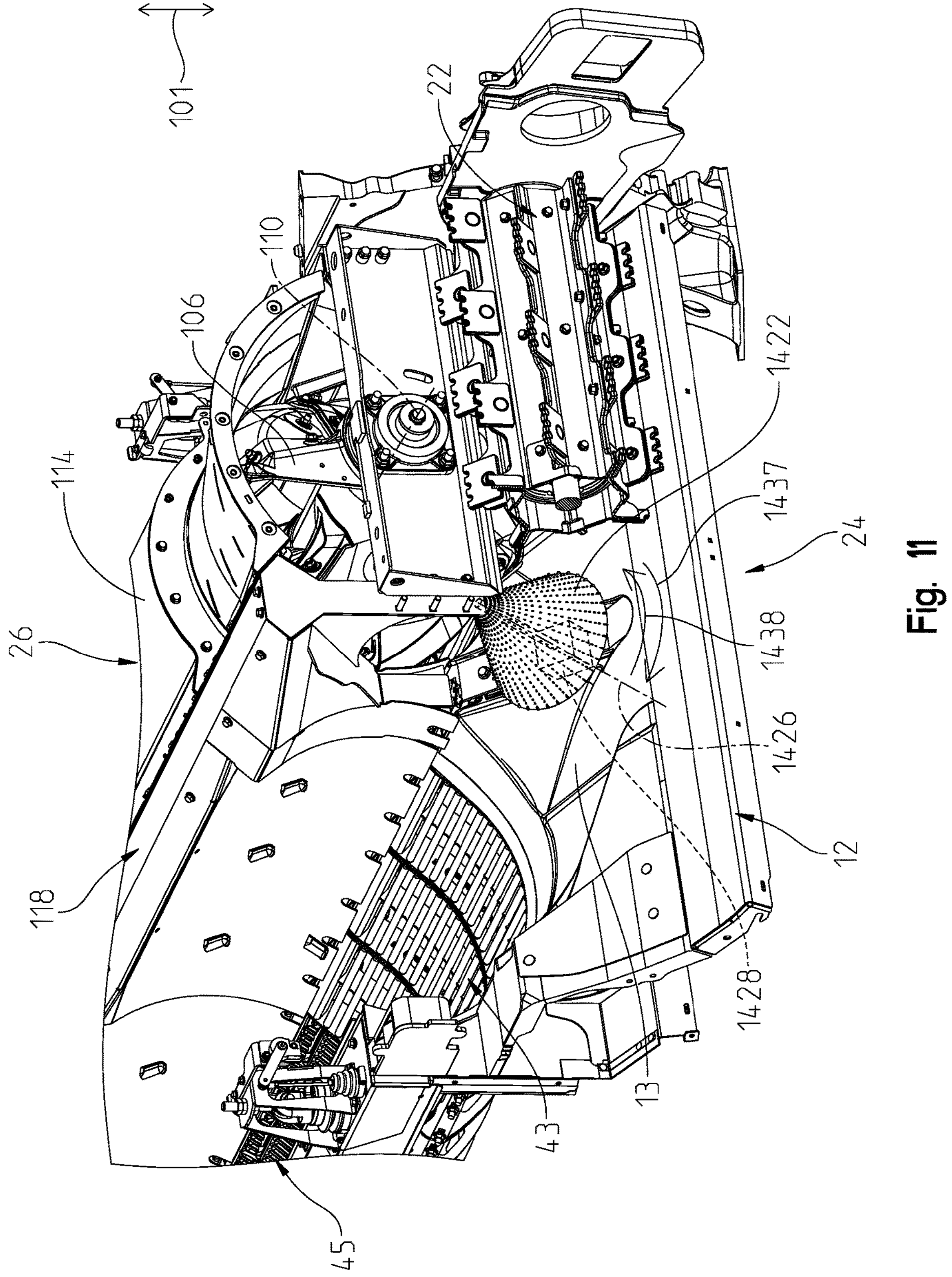
FIG. 11 is a front perspective view of another dual rotor threshing assembly with a deflector configured to be rotated to increase an amount of harvested crop directed to a first threshing rotor or a second threshing rotor depending on a direction of movement of the deflector.

FIG. 11 shows another implementation of the dual rotor threshing assembly 26, which includes a deflector 1422. The deflector 1422 is positioned laterally between the first threshing rotor 104 and the second threshing rotor 106. In the illustrative implementation, the deflector 1422 is positioned upstream of the first threshing rotor 104 and the second threshing rotor 106. The deflector 1422 is positioned downstream of the guide drum 22 and is configured to direct harvested crop received from the guide drum 22 toward each of the first threshing rotor 104 and the second threshing rotor 106.

As shown in FIG. 11, the deflector 1422 is moveable relative to the frame 12. Movement of the deflector 1422 alters an amount of harvested crop directed toward the first threshing rotor 104 and the second threshing rotor 106. For example, movement of the deflector 1422 increases the amount of harvested crop directed toward one of the first threshing rotor 104 and the second threshing rotor 106, and likewise, decreases the amount of harvested crop directed toward the other of the first threshing rotor 104 and the second threshing rotor 106. This is different than deflectors of conventional agricultural machines, which, all other variables being equal (e.g., tilt of the machine or crop intake at each side of the machine), tend to deflect harvested crop equally toward a first threshing rotor and a second threshing rotor. In the illustrative implementation, during movement of the deflector 1422, the deflector 1422 remains positioned between the first axis 108 and the second axis 110. In some implementations, a majority of the deflector 1422 is positioned below the first axis 108 and the second axis 110. In some implementations, an entirety of the deflector 1422 is positioned below the first axis 108 and the second axis 110.

As shown in FIG. 11, the deflector 1422 is configured to rotate clockwise in the direction of arrow 1437 or counter-clockwise in the direction of arrow 1438 about a rotational axis 1426 relative to the frame 12. The deflector 422 may also be described as rotatable clockwise or counter-clockwise relative to the spine 118 or the first and second threshing rotors 104, 106. In the illustrative implementation, the frame 12 includes the floor 13 over which harvested crop passes, and the deflector 1422 is rotatably coupled to the floor 13 of the frame 12. As shown in FIG. 11, in the illustrative implementation, the deflector 1422 is shaped to accommodate available space between the guide drum 22 and the first and second threshing rotors 104, 106. For example, in the illustrative implementation, the deflector 1422 is conical and narrows from a top portion to a bottom portion.

In the illustrative implementation, the deflector 1422 includes a plurality of protrusions for contacting and directing harvested crop. In the illustrative implementation, the deflector 1422 is coupled (for example, at the bottom portion) to an actuator 1428. In the illustrative implementation, the actuator 1428 is embodied as a rotary actuator; however, in some implementations, the actuator 1428 may be another type of actuator operable to rotate the deflector 1422. The actuator 1428 may be electric, hydraulic, pneumatic, or another type of actuator.

Figure 6:
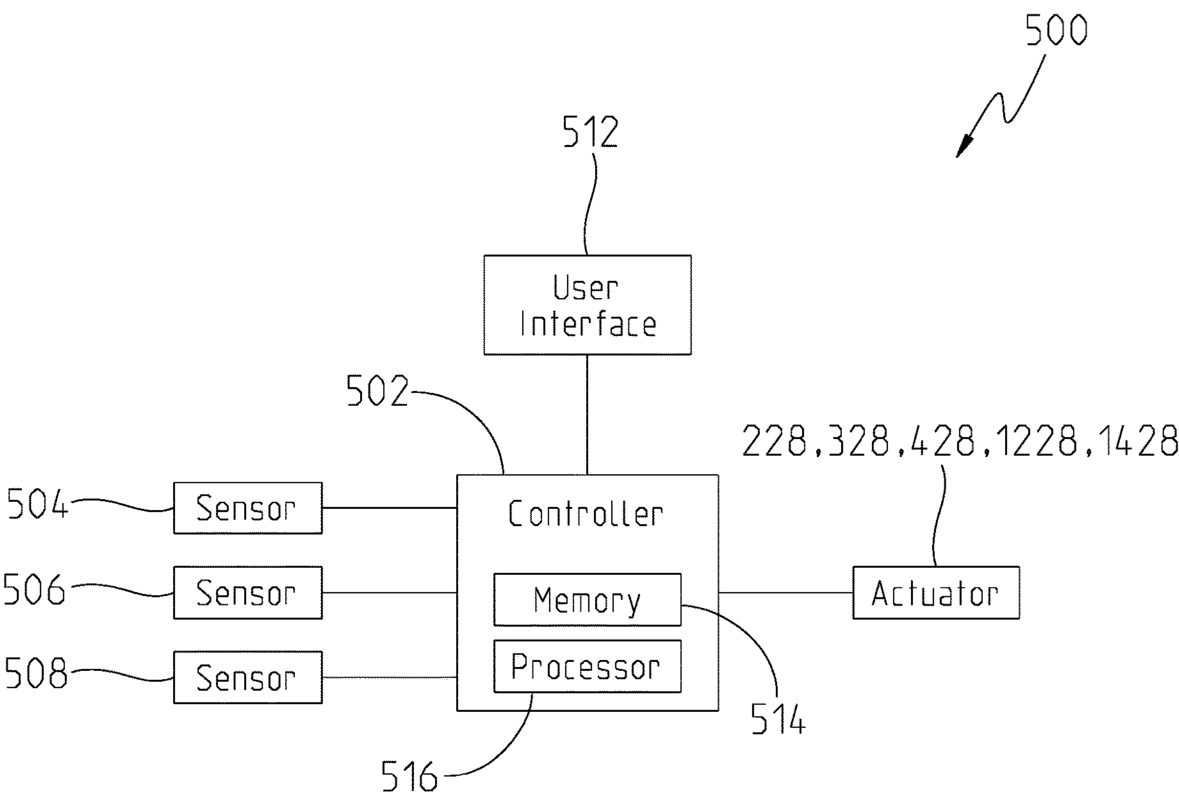
FIG. 6 is diagrammatic view of a control system for an agricultural machine showing a controller operatively coupled to at least one sensor configured to sense information associated with a first threshing rotor and a second threshing rotor.

As shown in FIG. 6, a control system 500 is usable to move the deflectors described herein. The control system 500 includes a controller 502, at least one actuator (e.g., actuators 228, 328, 428, 1228, 1428) that is operatively coupled to the controller 502, and at least one sensor (e.g., sensors 504, 506, 508) that is operatively coupled to the controller 502. The sensors are configured to send signals to the controller 502 that are used by the controller 502 to determine a direction of movement for the deflectors described herein. The control system 500 also includes a user interface 512 operatively coupled to the controller 502 and configured to send signals to the controller 502 indicative of information supplied to the user interface 512 by a user.

The control system 500 further includes one or more memories 514 included on or accessible by the controller 502 and one or more processors 516 included on or accessible by the controller 502. The one or more processors 516 are configured to execute instructions (i.e., one or more algorithms) stored on the one or more memories 514. The controller 502 may be a single controller or a plurality of controllers operatively coupled to one another. The controller 502 may be located on the agricultural machine 10 or positioned remotely, away from the agricultural machine 10. The controller 502 may be coupled via a wired connection or wirelessly to other components of the agricultural machine 10 and one or more remote devices. In some instances, the controller 502 may be connected wirelessly via Wi-Fi, Bluetooth, NFC or another wireless communication protocol. The user interface 512 is operatively coupled to the controller 502 and configured to send signals to the controller 502 indicative of information supplied to the user interface 512 by a user.

Figure 7:
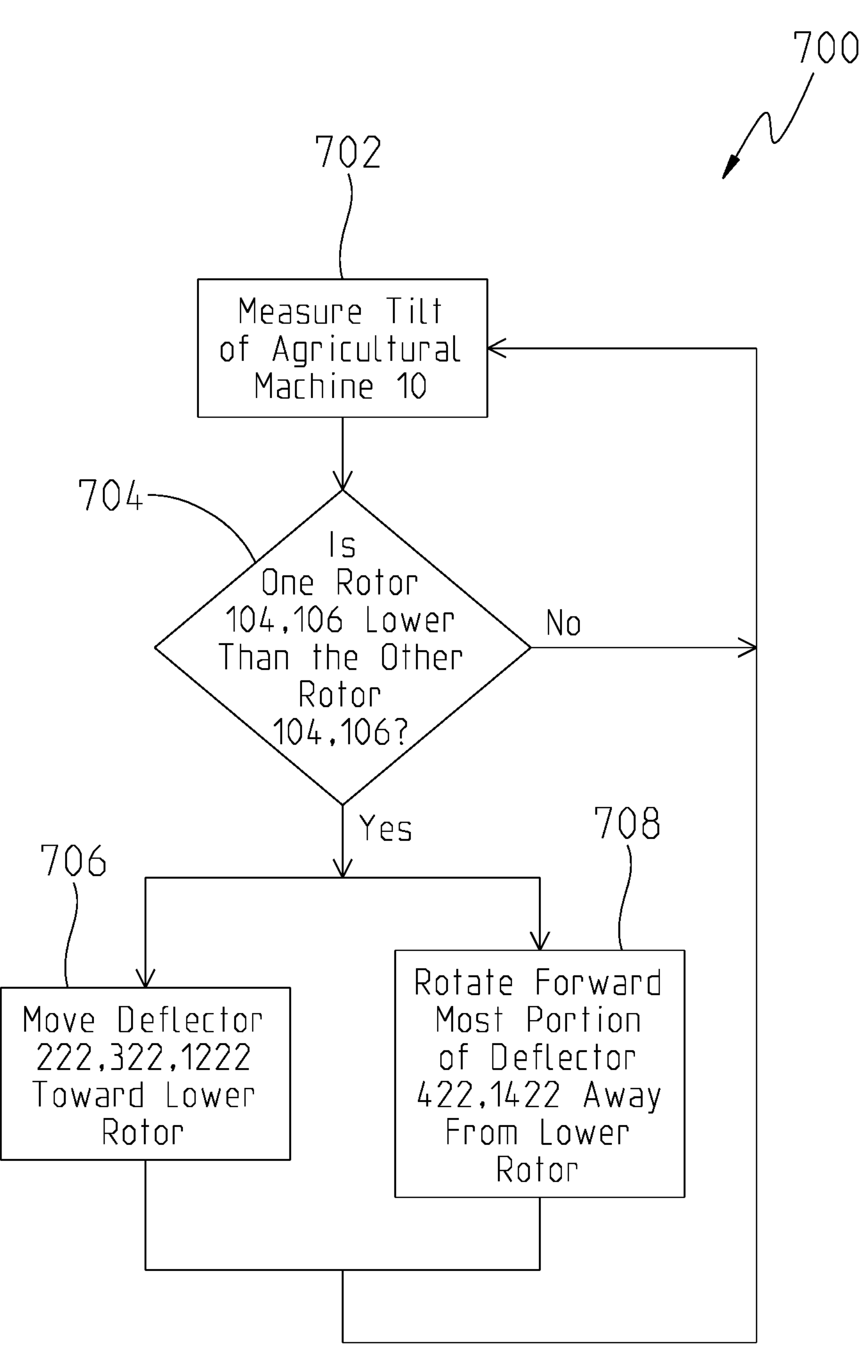
FIG. 7 is a flow chart of an example method of moving a deflector of an agricultural machine based on a measured tilt of the agricultural machine.

Referring now to FIG. 7, a method 700 is shown for controlling movement of a deflector of the agricultural machine 10. At 702, the sensor 504 measures an orientation of the agricultural machine 10. For example, as shown at step 702, the sensor 504 measures a tilt of the agricultural machine 10 relative to a surface (e.g., the ground surface) or the force of gravity. As the agricultural machine 10 tilts, one of the first threshing rotor 104 and the second threshing rotor 106 may be positioned higher than the other of the first threshing rotor 104 and the second threshing rotor 106. As a result, the rotor that is positioned lower intakes a greater amount of harvested crop than the rotor that is positioned higher. In use, the sensor 504 sends a signal to the controller 502 indicative of the measured tilt. In some implementations, at 704, the controller 502 determines whether one of the threshing rotors 104, 106 is positioned lower than the other threshing rotor 104, 106. As indicated by 706 and 708, the controller 502, adjusts the deflector (such as via actuation of one or more actuators operatively coupled to the controller 502), causing movement of the deflector such that additional harvested crop is directed toward the rotor located at the higher elevation. For example, as indicated at 706, if the first threshing rotor 104 is positioned lower than the second threshing rotor 106, then the controller 502 causes the actuator 228 or 1228 to pivot the deflector 222 or 1222 toward the first threshing rotor 104 to increase the amount of harvested crop directed to the second threshing rotor 106. In another example, as indicated at 706, if the first threshing rotor 104 is positioned lower than the second threshing rotor 106, then the controller 502 causes the actuator 328 to slide the deflector 322 toward the first threshing rotor 104 to increase the amount of harvested crop directed to the second threshing rotor 106.

In yet another example, as indicated at 708, if the first threshing rotor 104 is positioned lower than the second threshing rotor 106, then the controller 502 causes the actuator 428 to rotate a deflector 422 counter-clockwise in the direction of arrow 438, as shown in the context of FIG. 5, to increase the amount of harvested crop directed to the second threshing rotor 106. In other words, as indicated at 708, the controller 502 causes the actuator 428 to rotate the deflector 422 in a direction such that an increased amount of harvested crop is directed toward the higher-positioned rotor. In another example, as indicated at 708, if the first threshing rotor 104 is positioned lower than the second threshing rotor 106, then the controller 502 causes the actuator 1428 to rotate a deflector 1422 counter-clockwise in the direction of arrow 1438, as shown in the context of FIG. 11, to increase the amount of harvested crop directed to the second threshing rotor 106. In other words, as indicated at 708, the controller 502 causes the actuator 428, 1428 to rotate the deflector (e.g., 422, 1422) in a direction such that an increased amount of harvested crop is directed toward the higher-positioned threshing rotor.

In each of these examples, movement of the respective deflector 222, 322, 422, 1222, 1422 increases the amount of harvested crop directed toward the higher-positioned threshing rotor (104 or 106) of the dual rotor threshing assembly 26.

Figure 8:
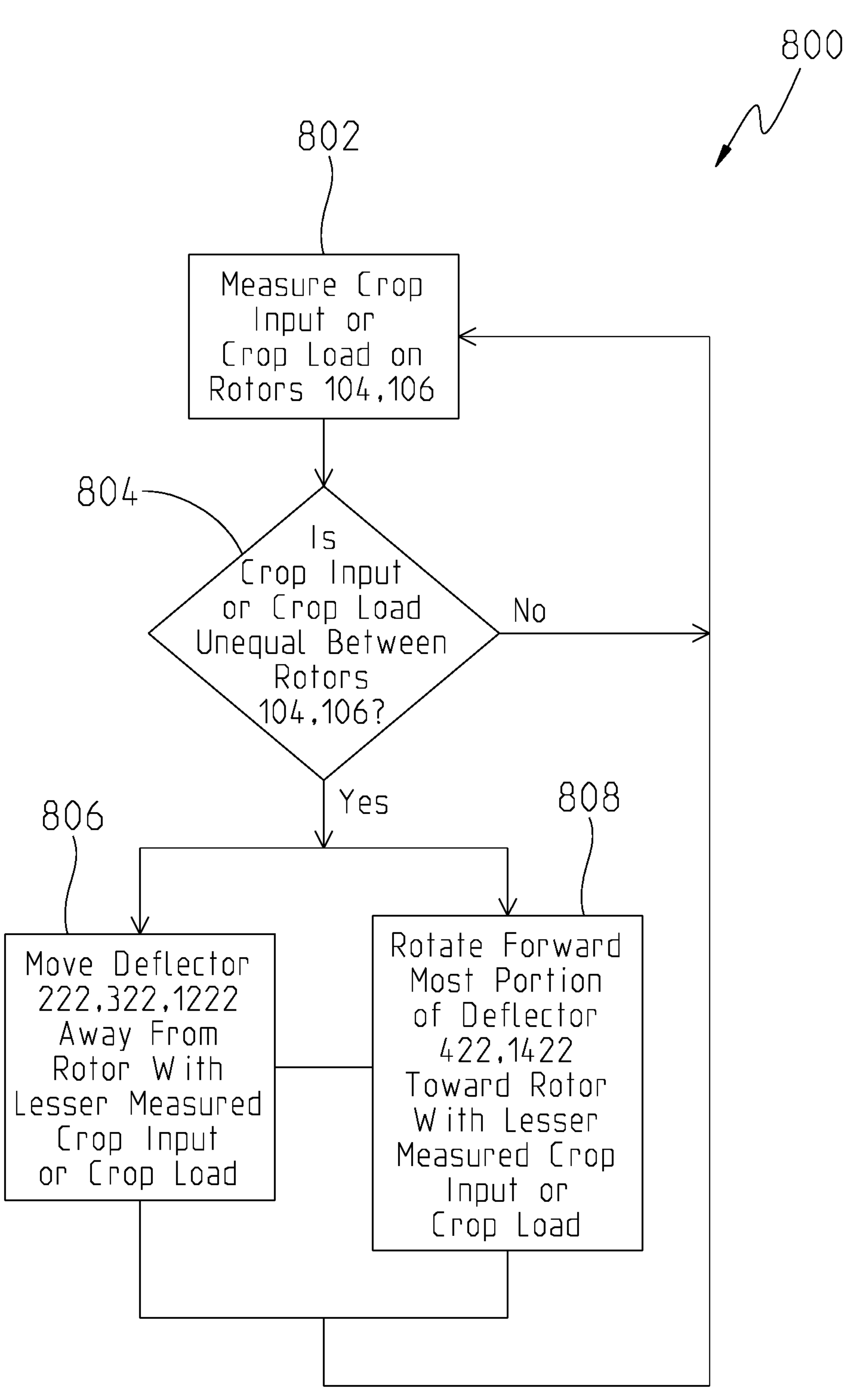
FIG. 8 is a flow chart of an example method of moving a deflector of an agricultural machine based on measured crop inputs to or crop loads on a first threshing rotor and a second threshing rotor of the agricultural machine.

FIG. 8 shows a flowchart of an example method 800 for moving a deflector of the agricultural machine 10. In some implementations, at 802, at least one sensor 506, 508 measures the crop input to the first threshing rotor 104 and the second threshing rotor 106 or the crop load on the first threshing rotor 104 and the second threshing rotor 106, each of which can be measured through different exemplary implementations described herein.

In one example, at 802, the at least one sensor 506 measures a crop load or a parameter indicative of a crop load of the first threshing rotor 104 and the second threshing rotor 106. In the some implementations, the at least one sensor 506 is positioned on or adjacent to each of the first and second threshing rotor assemblies 35, 36 or on the frame 12. For example, the at least one sensor 506 may be one or more strain gauges coupled to a laterally extending cross bar 111 of the frame 12 to which front portions of the first and second threshing rotors 104, 106 are coupled. In another example, the at least one sensor 506 may be one or more pressure sensors or one or more displacement sensors coupled to the thresher basket 47, the frame 12, or both. In some implementations, the at least one sensor 506 may measure, visually, the crop load on each rotor 104, 106. In some implementations, the at least one sensor 506 may be, for example, a camera.

At 804, the controller 502 receives the measured crop load or measured parameter indicative of crop load from the at least one sensor 506 and compares the measurements for the first threshing rotor 104 and the second threshing rotor 106. At 806 and 808, the controller 502 adjusts a deflector (e.g., by actuating one or more actuators operatively coupled to the controller 502), causing movement of the deflector such that additional harvested crop is directed toward the rotor of the dual rotor threshing assembly 26 having a lesser crop load.

In some implementations, the at least one sensor 506 measures the torque of the first threshing rotor 104 and the second threshing rotor 106. In some implementations, the at least one sensor 506 measures a parameter indicative of the torque of the first and second threshing rotors 104, 106, respectively, but does not measure the torque directly. For example, a fluid pressure, such a hydraulic or pneumatic pressure, that is used to drive the first or second threshing rotor 104, 106 can be measured, and the measured pressure can be used to determine the torque of the first or second threshing rotor 104, 106 via the controller 502. The torque (like the pressure, displacement, or strain) may reflect or be used as a proxy for the crop load of the first threshing rotor 104 and the second threshing rotor 106. In each example, the measured values for the first threshing rotor 104 and the second threshing rotor 106 are compared, and the adjustment is made accordingly by the controller 502, as described above.

In one example, as indicated at 806, if the first threshing rotor 104 is the rotor with a lesser crop load, then the controller 502 causes the actuator 228 to pivot the deflector 222 toward the second threshing rotor 106 to increase the amount of harvested crop directed to the first threshing rotor 104. In another example, as indicated at 806, if the first threshing rotor 104 is the rotor with a lesser crop load, then the controller 502 causes the actuator 1228 to pivot the deflector 1222 toward the second threshing rotor 106 to increase the amount of harvested crop directed to the first threshing rotor 104. In another example, as indicated at 806, if the first threshing rotor 104 is the rotor with lesser crop load, then the controller 502 causes the actuator 328 to slide the deflector 322 toward the second threshing rotor 106 to increase the amount of harvested crop directed to the first threshing rotor 104. In another example, as indicated at 808, if the first threshing rotor 104 is the rotor with lesser crop load, then the controller 502 causes the actuator 428 to rotate the deflector 422 clockwise in the direction of arrow 437 (as shown in the context of FIG. 5) to increase the amount of harvested crop directed to the first threshing rotor 104. In other words, at 808, the controller 502 causes the actuator 428 to rotate the deflector 422 in a direction such that an increased amount of harvested crop is directed toward the rotor with lesser crop load. In another example, as indicated at 808, if the first threshing rotor 104 is the rotor with lesser crop load, then the controller 502 causes the actuator 1428 to rotate the deflector 1422 clockwise in the direction of arrow 1437 (as shown in the context of FIG. 11) to increase the amount of harvested crop directed to the first threshing rotor 104. In other words, at 808, the controller 502 causes the actuator (e.g., 428, 1428) to rotate the deflector (e.g., 422, 1422) in a direction such that an increased amount of harvested crop is directed toward the threshing rotor with lesser crop load. In each of these examples, movement of the respective deflector 222, 322, 422, 1222, 1422 increases the amount of harvested crop directed toward the threshing rotor with the lesser crop load.

In some implementations, as indicate at 802, the at least one sensor 508 measures the crop input to the first threshing rotor 104 and the second threshing rotor 106. As indicated at 804, the controller 502 receives a crop input measurement from the at least one sensor 508 and compares the measured crop inputs for the first threshing rotor 104 and the second threshing rotor 106. At 806 and 808, the controller 502 adjusts the deflector (e.g., via actuation of an actuator that is operatively coupled to the deflector), causing movement of the deflector such that additional harvested crop is directed toward the rotor having a lesser crop input. In some implementations, the at least one sensor 508 may measure, visually, the crop input to each rotor 104, 106. In some implementations, the at least one sensor 508 may be, for example, a camera. The visually measured crop inputs are compared, and the adjustment is made accordingly by the controller 502, as described above.

In one example, as indicated at 806, if the first threshing rotor 104 is the rotor with lesser measured crop input, then the controller 502 causes the actuator 228 to pivot the deflector 222 toward the second threshing rotor 106 to increase the amount of harvested crop directed to the first threshing rotor 104. In another example, as indicated at 806, if the first threshing rotor 104 is the rotor with lesser measured crop input, then the controller 502 causes the actuator 1228 to pivot the deflector 1222 toward the second threshing rotor 106 to increase the amount of harvested crop directed to the first threshing rotor 104. In another example, at 806, if the first threshing rotor 104 is the rotor with lesser measured crop input, then the controller 502 causes the actuator 328 to slide the deflector 322 toward the second threshing rotor 106 to increase the amount of harvested crop directed to the first threshing rotor 104. In another example, at 808, if the first threshing rotor 104 is the rotor with lesser measured crop input, then the controller 502 causes the actuator 428 to rotate the deflector 422 clockwise in the direction of arrow 437 (as shown in the context of FIG. 5) to increase the amount of harvested crop directed to the first threshing rotor 104. In another example, at 808, if the first threshing rotor 104 is the rotor with lesser measured crop input, then the controller 502 causes the actuator 1428 to rotate the deflector 1422 clockwise in the direction of arrow 1437 (as shown in the context of FIG. 11) to increase the amount of harvested crop directed to the first threshing rotor 104. In other words, at 808, the controller 502 causes the actuator (e.g., 428, 1428) to rotate the deflector (e.g., 422, 1422) in a direction such that an increased amount of harvested crop is directed toward the rotor with lesser measured crop input. In each of these examples, movement of the respective deflector 222, 322, 422, 1222, 1422 increases the amount of harvested crop directed toward the rotor with lesser measured crop input.

The methods described herein may be broadly considered processes for balancing or otherwise redistributing the crop load of, crop input to, crop processed by, or crop output from the first threshing rotor 104 and the second threshing rotor 106. Such processes may occur automatically, via execution by the controller 502, in response to signals received by the sensors 504, 506, 508, without user intervention. However, in some implementations, a user may input instructions to the user interface 512, which sends a signal to the controller 502 indicative of the instructions. In response, the controller 502 adjusts an actuator (e.g., 228, 328, 428, 1228, 1428) operatively coupled thereto causing movement of a respective deflector (e.g., 222, 322, 422, 1222, 1422). Thus, in response to input from the user interface 512, the deflectors 222, 322, 422, 1222, 1422 are configured to increase the amount of harvested crop directed toward the first threshing rotor 104 or the second threshing rotor 106.

While the disclosure has been illustrated and described in detail in the drawings and foregoing description, such illustration and description are to be considered as exemplary and not restrictive in character, it being understood that illustrative implementation(s) have been shown and described and that all changes and modifications that come within the spirit of the disclosure are desired to be protected. It will be noted that alternative implementations of the present disclosure may not include all of the features described yet still benefit from at least some of the advantages of such features. Those of ordinary skill in the art may readily devise their own implementations that incorporate one or more of the features of the present disclosure and fall within the spirit and scope of the present disclosure as defined by the appended claims.

The invention claimed is:

1. An agricultural machine for processing harvested crop comprising:

a cutting head configured to harvest crop; and a dual rotor threshing assembly configured to process the harvested crop and including:

a first threshing rotor rotationally coupled to a frame;

a second threshing rotor rotationally coupled to the frame; and a deflector that is moveable relative to the frame to increase an amount of harvested crop directed toward the first threshing rotor or the second threshing rotor, wherein the deflector is positioned upstream of the first threshing rotor and the second threshing rotor.

2. The agricultural machine of claim 1, wherein the first threshing rotor is rotatable about a first axis and the second threshing rotor is rotatable about a second axis; and wherein the deflector is positioned between the first axis and the second axis.

3. The agricultural machine of claim 2, wherein a majority of the deflector is positioned below the first axis and the second axis.

4. The agricultural machine of claim 1, wherein the deflector is configured to be pivoted relative to the frame.

5. The agricultural machine of claim 1, wherein the deflector is configured to be slid relative to the frame.

6. The agricultural machine of claim 1, wherein the deflector is configured to be rotated relative to the frame.

7. The agricultural machine of claim 1, further comprising an actuator and a controller operatively coupled to the actuator, wherein actuation of the actuator causes movement of the deflector relative to the frame; and wherein the controller is configured to receive signals used by the controller to determine a direction of movement for the deflector.

8. The agricultural machine of claim 7, further comprising at least one sensor operatively coupled to the controller and configured to send signals to the controller that are used by the controller to determine the direction of movement for the deflector.

9. An agricultural machine for processing harvested crop comprising:

a cutting head configured to harvest crop; and a dual rotor threshing assembly configured to process the harvested crop and including:

a first threshing rotor rotationally coupled to a frame;

a second threshing rotor rotationally coupled to the frame;

a deflector that is moveable relative to the frame to increase an amount of harvested crop directed toward the first threshing rotor or the second threshing rotor; and at least one sensor operatively coupled to a controller and configured to send signals to the controller that are used by the controller to determine a direction of movement for the deflector;

wherein the at least one sensor is configured to measure a parameter indicative of crop load on the first threshing rotor and on the second threshing rotor; and wherein the controller is configured to send signals to an actuator causing movement of the deflector to increase the amount of harvested crop directed toward the first threshing rotor or the second threshing rotor depending on which of the first threshing rotor and the second threshing rotor has a lesser crop load.

10. The agricultural machine of claim 8, wherein the at least one sensor is configured to measure a tilt of the agricultural machine;

wherein the controller is configured to send signals to the actuator causing movement of the deflector to increase the amount of harvested crop directed toward the first threshing rotor or the second threshing rotor depending on the measured tilt of the agricultural machine.

11. The agricultural machine of claim 8, wherein the at least one sensor is configured to measure, visually, a crop load on the first threshing rotor and on the second threshing rotor; and wherein the controller is configured to send signals to the actuator causing movement of the deflector to increase the amount of harvested crop directed toward the first threshing rotor or the second threshing rotor depending on which of the first threshing rotor and the second threshing rotor has a lesser crop load.

12. The agricultural machine of claim 8, wherein the at least one sensor is configured to measure torque or a parameter indicative of torque of the first threshing rotor and of the second threshing rotor; and wherein the controller is configured to send signals to the actuator causing movement of the deflector to increase the amount of harvested crop directed toward the first threshing rotor or the second threshing rotor depending on which of the first threshing rotor and the second threshing rotor has a lesser torque.

13. The agricultural machine of claim 8, wherein the at least one sensor is configured to measure crop input to the first threshing rotor and to the second threshing rotor; and wherein the controller is configured to send signals to the actuator causing movement of the deflector to increase the amount of harvested crop directed toward the first threshing rotor or the second threshing rotor depending on which of the first threshing rotor and the second threshing rotor has a lesser crop input.

14. The agricultural machine of claim 7, further comprising a user interface operatively coupled to the controller and configured to send signals thereto indicating a direction of movement for the actuator based on user input.

15. The agricultural machine of claim 1, further comprising: a guide drum configured to rotate relative to the frame to direct harvested crop toward the first threshing rotor and the second threshing rotor;

wherein the deflector is positioned downstream of the guide drum.

16. An agricultural machine for processing harvested crop comprising:

a first threshing rotor configured to rotate about a first axis to process the harvested crop;

a second threshing rotor positioned adjacent to the first threshing rotor and configured to rotate about a second axis to process harvested crop; and a deflector positioned between the first axis and the second axis;

wherein the deflector is moveable relative to the first axis and the second axis; and wherein the deflector is configured to increase an amount of harvested crop directed toward one of the first threshing rotor and the second threshing rotor via movement of the deflector relative to the first axis and the second axis.

17. The agricultural machine of claim 16, further comprising a frame coupled to the first threshing rotor and the second threshing rotor;

wherein the deflector is moveably coupled to the frame.

18. The agricultural machine of claim 17, wherein the deflector is removably coupled to the frame.

19. A method of processing harvested crop with an agricultural machine comprising:

harvesting crop as the agricultural machine moves along a ground surface;

moving a deflector positioned upstream of the first threshing rotor and the second threshing rotor in one of a first direction and a second direction to increase an amount of harvested crop directed toward a first threshing rotor coupled to a frame or a second threshing rotor coupled to the frame and positioned adjacent to the first threshing rotor;

wherein moving the deflector in one of the first direction and the second direction comprises at least one of:

pivoting the deflector toward one of the first threshing rotor and the second threshing rotor;

sliding the deflector toward one of the first threshing rotor and the second threshing rotor; and rotating the deflector about a rotational axis in one of a clockwise direction and a counterclockwise direction.

* * * * *